(12) United States Patent
Jiang et al.

(10) Patent No.: US 11,467,325 B2
(45) Date of Patent: Oct. 11, 2022

(54) OPTICAL FILTER AND MANUFACTURING METHOD THEREFOR, DISPLAY SUBSTRATE, AND DISPLAY APPARATUS

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Liangliang Jiang, Beijing (CN); Haifeng Wang, Beijing (CN); Lei Guo, Beijing (CN); Yong Jun Yoon, Beijing (CN)

(73) Assignees: Hefei Xinsheng Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 32 days.

(21) Appl. No.: 16/725,719

(22) Filed: Dec. 23, 2019

(65) Prior Publication Data
US 2020/0225388 A1    Jul. 16, 2020

Related U.S. Application Data

(62) Division of application No. 15/535,986, filed as application No. PCT/CN2016/101142 on Sep. 30, 2016, now abandoned.

(30) Foreign Application Priority Data

Oct. 30, 2015    (CN) .......................... 201510728954.9

(51) Int. Cl.
G02B 5/02    (2006.01)
G02B 5/22    (2006.01)
(Continued)

(52) U.S. Cl.
CPC ............. *G02B 5/201* (2013.01); *G02B 5/223* (2013.01); *G02F 1/1335* (2013.01);
(Continued)

(58) Field of Classification Search
CPC . G02B 5/00; G02B 5/003; G02B 5/20; G02B 5/201; G02B 5/206; G02B 5/223;
(Continued)

(56) References Cited

U.S. PATENT DOCUMENTS 4,744,635 A    5/1988  Takaochi et al.
6,710,366 B1   3/2004  Lee et al.
(Continued)

FOREIGN PATENT DOCUMENTS

CN    1684566 A      10/2005
CN    101026199 A    8/2007
(Continued)

OTHER PUBLICATIONS

The First Chinese Office Action dated Jan. 31, 2018 Appln. No. 201610028824.9.
(Continued)

*Primary Examiner* — Thong Q Nguyen (57) ABSTRACT

An optical filter and manufacturing method therefor, a display substrate, and a display apparatus. The optical filter includes: a base substrate; an ordered porous film disposed on the base substrate, wherein the ordered porous film is formed with channels each of which having an extension direction at least at an angle to the base substrate and having an opening at a surface of the ordered porous film; and a plurality of quantum dots respectively disposed in at least part of the channels. The optical filter, the display substrate having the optical filter and the display apparatus can significantly improve the display colour gamut of the display apparatus.

19 Claims, 7 Drawing Sheets

(51) Int. Cl.
*G02B 5/20* (2006.01)
*G02F 1/1335* (2006.01)
*G02F 1/13357* (2006.01)
*H05B 33/14* (2006.01)
*B82Y 20/00* (2011.01)

(52) U.S. Cl.
CPC .. *G02F 1/133514* (2013.01); *G02F 1/133617* (2013.01); *H05B 33/145* (2013.01); *B82Y 20/00* (2013.01); *G02F 2202/36* (2013.01)

(58) Field of Classification Search
CPC ... G02B 5/22; G02F 1/1335; G02F 1/133514; G02F 1/133617
USPC ........ 359/601, 609, 613, 614, 599, 589, 891
See application file for complete search history.

(56) References Cited

U.S. PATENT DOCUMENTS

| | | | |
|---|---|---|---|
| 8,884,509 B2 * | 11/2014 | Matsukura | G02B 5/201 |
| | | | 313/501 |
| 9,971,075 B2 * | 5/2018 | Jiang | G02F 1/133514 |
| 10,295,872 B2 * | 5/2019 | Jiang | G02F 1/133602 |
| 2004/0150979 A1 | 8/2004 | Lambertini et al. | |
| 2005/0206306 A1 | 9/2005 | Perlo et al. | |
| 2007/0020779 A1 | 1/2007 | Stavis et al. | |
| 2007/0224713 A1 | 9/2007 | Han et al. | |
| 2009/0237800 A1 | 9/2009 | Nakamura et al. | |
| 2010/0296845 A1 | 11/2010 | Hirakawa et al. | |
| 2011/0023932 A1 | 2/2011 | Fukui et al. | |
| 2011/0044026 A1 * | 2/2011 | Deeben | H01L 33/508 |
| | | | 362/84 |
| 2011/0139248 A1 | 6/2011 | Liu et al. | |
| 2011/0146774 A1 | 6/2011 | Kim et al. | |
| 2011/0227960 A1 | 9/2011 | Cho et al. | |
| 2011/0281388 A1 | 11/2011 | Gough et al. | |
| 2011/0284819 A1 | 11/2011 | Kang et al. | |
| 2012/0132888 A1 | 5/2012 | Kwak et al. | |
| 2013/0010229 A1 * | 1/2013 | Shin | G02F 1/133514 |
| | | | 349/62 |
| 2014/0124802 A1 | 5/2014 | Do et al. | |
| 2014/0132890 A1 * | 5/2014 | Zhang | G02F 1/133514 |
| | | | 349/69 |
| 2014/0158982 A1 * | 6/2014 | Park | H01L 33/50 |
| | | | 257/13 |
| 2015/0002788 A1 | 1/2015 | Guo et al. | |
| 2015/0042612 A1 | 2/2015 | Lee | |
| 2015/0194467 A1 | 7/2015 | Zhang et al. | |
| 2015/0380654 A1 | 12/2015 | Tang et al. | |
| 2016/0218141 A1 | 7/2016 | Cai | |
| 2016/0369993 A1 | 12/2016 | Hikmet et al. | |
| 2017/0003423 A1 | 1/2017 | Jiang et al. | |
| 2018/0011231 A1 | 1/2018 | Jiang et al. | |

FOREIGN PATENT DOCUMENTS

| | | |
|---|---|---|
| CN | 101393938 A | 3/2009 |
| CN | 102255019 A | 11/2011 |
| CN | 102941077 A | 2/2013 |
| CN | 102944943 A | 2/2013 |
| CN | 103345884 A | 10/2013 |
| CN | 103346154 A | 10/2013 |
| CN | 204227219 U | 3/2015 |
| CN | 104932136 A | 9/2015 |
| CN | 105204104 A | 12/2015 |
| CN | 205067782 U | 3/2016 |
| CN | 105609535 A | 5/2016 |
| JP | 05119214 A | 5/1993 |
| JP | 0878769 A | 3/1996 |
| JP | 09159818 A | 6/1997 |
| WO | 2014/147570 A1 | 9/2014 |

OTHER PUBLICATIONS

The First Chinese Office Action dated Mar. 2, 2017; Appln. No. 201510728954.9.
The Second Chinese Office Action dated Aug. 2, 2017; Appln. No. 201510728954.9.
International Search Report and Written Opinion dated Dec. 16, 2016; PCT/CN2016/098949.
International Search Report and Written Opinion dated Dec. 27, 2016; PCT/CN2016/101142.
USPTP RR dated Jan. 14, 2019 in connection with U.S. Appl. No. 15/535,986.
USPTO NFOA dated Jun. 4, 2019 in connection with U.S. Appl. No. 15/535,986.
USPTO FOA dated Sep. 23, 2019 in connection with U.S. Appl. No. 15/535,986.
USPTO NFOA dated Nov. 15, 2018 in connection with U.S. Appl. No. 15/537,671.
USPTO NOA dated Mar. 12, 2019 in connection with U.S. Appl. No. 15/537,671.

* cited by examiner

OPTICAL FILTER AND MANUFACTURING METHOD THEREFOR, DISPLAY SUBSTRATE, AND DISPLAY APPARATUS

TECHNICAL FIELD

Embodiments of the present disclosure relate to an optical filter and a method of manufacturing the same, a display substrate and a display device.

BACKGROUND

TFT-LCD (Thin Film Transistor-Liquid Crystal Display, thin film transistor liquid crystal display) plays an important role in the field of display owing to its advantages such as high quality of image display, low energy consumption, environmental friendliness, and the like. Currently, TFT-LCD mainly comprises a display panel and a backlight module disposed on the back side of the display panel, wherein the display panel is formed by assembling an array substrate and an opposing substrate, and liquid crystal is filled in the cavity after assembling the array substrate and the opposing substrate.

In the related art, the opposing substrate in the TFT-LCD is, for example, a color film substrate, including an optical filter layer which is generally distributed with color resist patterns (sub-pixels) of red, green and blue colors, wherein the white light emitted from the backlight module may form light of different colors by mixing light after optical filtered by these color resist patterns, thereby achieving color display of the liquid crystal display.

SUMMARY

At least one embodiment of the present disclosure provides an optical filter and a method of manufacturing the same, a display substrate and a display device, so as to enlarge the display color gamut of the display device.

Embodiments of the present disclosure provide an optical filter, comprising a base substrate, an ordered porous film disposed on the base substrate, and a plurality of quantum dots. The ordered porous film is formed with channels each of which having an extension direction at least at an angle to the base substrate and having an opening at a surface of the ordered porous film; and the plurality of quantum dots are respectively disposed in at least part of the channels.

At least one embodiment of the present disclosure further provides a display substrate, comprising the optical filter as described in the above embodiments of the present disclosure.

At least one embodiment of the present disclosure further provides a display device, comprising the display substrate as described in the above embodiments of the present disclosure.

At least one embodiment of the present disclosure further provides a method of manufacturing an optical filter, comprising: forming an ordered porous film on a base substrate, wherein the ordered porous film is formed with channels each of which having an extension direction at least at an angle to the base substrate and having an opening at a surface of the ordered porous film; and immersing the ordered porous film in a solution containing quantum dots to allow each of at least part of the channels to be filled with at least one quantum dot.

BRIEF DESCRIPTION OF THE DRAWINGS

In order to more clearly illustrate the technical solutions of the embodiments of the present disclosure, the drawings required to describe the embodiments or related art are briefly illustrated below. Apparently, the drawings described below relate to only some embodiments of the present disclosure and thus are not limitative of the present disclosure.

DETAILED DESCRIPTION

To make clearer the objects, technical solutions and advantages of the embodiments of the present disclosure, a clear and full description of the technical solutions of the embodiments of the present disclosure will be made with reference to the accompanying drawings of the embodiments of the present disclosure. Apparently, the embodiments described are just part rather than all of the embodiments of the present disclosure. Based on the embodiments of the present disclosure as described, all the other embodiments obtained by a person of ordinary skill in the art, without any creative labor, fall within the scope of protection of the present disclosure.

Unless otherwise defined, the technical terms or scientific terms used in the present disclosure shall have general meanings interpreted by a person of ordinary skill in the art to which the present disclosure pertains. The words "first", "second" and the like used in the present disclosure do not denote any order, quantity or importance, but are merely used to distinguish between different components. The words "comprise", "include" and the like mean that the elements or objects preceding the words cover the elements or objects listed after the words and their equivalents thereof, without excluding other elements or objects. The words "connected", "linked" and the like are not limited to physical or mechanical connection, but may include electrical connection, whether direct or indirect. The words "upper", "lower", "left", "right" and the like are used only to represent the relative positional relationship, and the relative positional relationship may be changed accordingly if the absolute position of the object described changes.

Light-emitting diode (LED) is typically used as a light source of a backlight module, and the Full-Width Half-Maximum (FWHM) of the light emitted by the LED is great; and the color photoresist material in the optical filter layer itself includes dye small molecules, and emits light of a corresponding color after optical filtering and absorbing part of the backlight, thus limiting the luminous efficiency of the optical filter layer. Therefore, the color of the light formed by mixing light is impure, resulting in a low color gamut of the image and the color insufficiently bright and true.

Quantum dots, as a new type of semiconductor nanomaterial, have many unique nano scale properties. In particular, quantum dots have a uniform particle size, a high luminous efficiency and can emit red light, green light or blue light with a small Full-Width Half-Maximum (FWHM) after receiving light or being excited by electricity, which can greatly improve the color gamut range of the display, and thus are extensively applied in realizing wide color gamut display.

For example, a quantum dot may be used as a backlight source in a backlight module, which is used together with an optical filter layer formed by using a color photoresist material in a display panel to achieve color display and improve color gamut. In this way, the utilization of quantum dots is low, and the improvement in the color gamut range is limited due to the need of the use of an optical filter layer formed by using a color photoresist material.

At least one embodiment of the present disclosure provides an optical filter and a method of manufacturing the same, a display substrate and a display device, the optical filter comprising a base substrate, an ordered porous film disposed on the base substrate, and a plurality of quantum dots, wherein the ordered porous film is formed with channels each of which having an extension direction at least at an angle to the base substrate and having an opening at a surface of the ordered porous film, and the plurality of quantum dots are respectively disposed in at least part of the channels.

On the one hand, the optical filter, the display substrate having the optical filter and the display device according to the embodiments of the present disclosure can significantly enlarge the display color gamut of the display device; on the other hand, the embodiments of the present disclosure can greatly improve the utilization of quantum dots compared with the use of quantum dots as a backlight source.

It shall be noted that the optical filter according to the embodiments of the present disclosure can be applied to a liquid crystal display or to any other devices requiring the use of an optical filter.

An ordered porous film is such a film formed by using an ordered porous material. Ordered porous materials are new nano-structured materials that have been extensively used since the 1990s, and have the characteristics of uniform channel size, regular channel arrangement, and continuous adjustability of the pore size of the channel within a certain range.

Embodiment I

Figure 1:
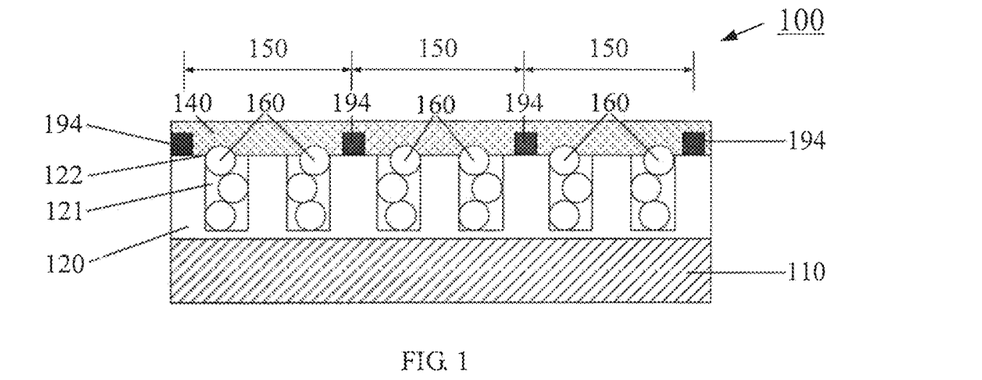
FIG. 1 is a schematic view of an optical filter according to an embodiment of the present disclosure.
Figure 2:
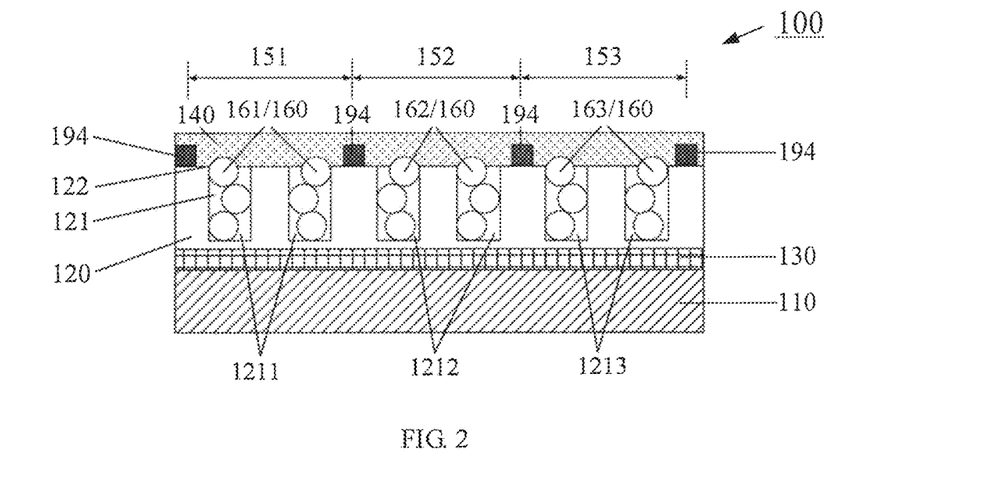
FIG. 2 is a schematic view of an optical filter according to a further embodiment of the present disclosure.

Embodiment I of the present disclosure provides an optical filter 100, as illustrated in FIG. 1 and FIG. 2, comprising a base substrate 110, an ordered porous film 120 disposed on the base substrate 110, and a plurality of quantum dots 160. The ordered porous film 120 is formed with channels 121 each of which having an extension direction (i.e., a direction from one end of each of the channels 121 adjacent to the base substrate 110 to the other end away from the base substrate 110) at least at an angle that is not zero to the base substrate 110 and having an opening 122 at a surface of the ordered porous film 120, and the above plurality of quantum dots 160 are respectively disposed in at least part of the channels 121, i.e., some of the channels are not filled with quantum dots.

Figure 9:
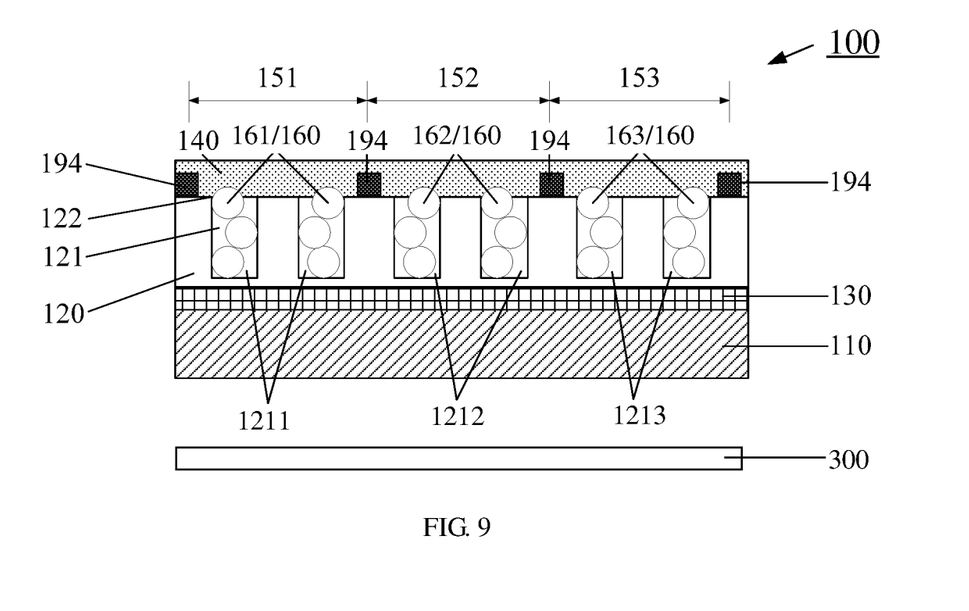
FIG. 9 is a schematic view of a display device with an excitation light source.

As illustrated in FIG. 9, the operational principle of the optical filter according to the embodiment of the present disclosure is as follows: the optical filter 100 is irradiated from an excitation light source 300 on the side of the base substrate 110 away from the ordered porous film 120 by, for example, excitation light (e.g., blue light, violet light or ultraviolet light, etc.), the excitation light being irradiated to the quantum dots 160 in the channels 121 of the ordered porous film 120 through the base substrate 110 so that the quantum dots 160 are excited to emit light; the light emitted from the quantum dots 160 exits the opening 122 of the channels 121. By enabling the quantum dots within the channels in the same region to emit light of the same color, the region of the optical filter can emit light of a relatively pure color.

In order to protect the ordered porous film, especially to make the position at which the channels of the ordered porous film are located thin so as to ensure light transmittance at that place, the ordered porous film is supported with a transparent base substrate in the embodiments of the present disclosure. For example, in the optical filter 100 according to at least one example of the embodiment of the present disclosure, the base substrate 110 may be a glass substrate or a quartz substrate. Apparently, the embodiments of the present disclosure include, but are not limited to this case.

In the embodiment of the present disclosure, the extension direction of the channels 121 is made perpendicular to the base substrate 110 as much as possible to facilitate irradiation of excitation light to the quantum dots 160 in the channels 121 and to enable the light emitted from the quantum dots 160 to exit the opening of the channels as much as possible (that is, to avoid irradiation to the inner walls of the channels) so as to improve the luminous efficiency of the quantum dots and the utilization of the light emitted.

For example, in the optical filter 100 according to at least one example of the embodiments of the present disclosure, the angle between the extension direction of each of the channels 121 and the base substrate 110 may be ranged from 60° to 90°.

Further, for example, in the optical filter 100 according to at least one example of the embodiments of the present disclosure, the angle between the extension direction of each of the channels 121 and the base substrate 110 may be ranged from 80° to 90°. For example, the angle is preferably 90°.

For example, in the optical filter 100 according to at least one example of the embodiment of the present disclosure, each of at least part of the channels 121 is provided with a column of quantum dots 160 (the column of quantum dots are arranged substantially along the extension direction of the channels), preferably one quantum dot 160. This arrangement minimizes the occurrence of agglomeration and self-quenching in the direction parallel to the base substrate 110 between the quantum dots 160 caused by providing each channel with rows of quantum dots, thereby increasing the luminous efficiency of the quantum dots in each channel Apparently, each of at least part of the channels 121 can also be provided with rows of quantum dots if the application requirements are met.

For example, in the optical filter 100 according to at least one example of the embodiment of the present disclosure, the ratio of the average size of the opening 122 of at least part of the channels 121 to the average size of the quantum dots 160 is greater than 1 and less than 2. This helps to enable each of at least part of the channels 121 to enter one quantum dot or a column of quantum dots after immersing the porous ordered film in the solution containing quantum dots upon making the optical filter 100, so as to avoid low luminous efficiency of the quantum dots caused by entry of rows of quantum dots into the same channel.

For example, in the optical filter 100 according to at least one example of the embodiment of the present disclosure, the opening 122 of at least part of the channels 121 may have an average size of from 2 nm to 200 nm. This is because the average size of quantum dots ranges from 2 nm to 200 nm. The design of the size of the opening of the channels according to the size of the quantum dots facilitates entry of one quantum dot or a column of quantum dots into each channel.

For example, in the optical filter 100 according to at least one example of the embodiment of the present disclosure, the opening 122 of at least part of the channels 121 has an average size of preferably from 2 nm to 20 nm. This is because the average size of conventional quantum dots is ranged from 2 nm to 20 nm.

In summary, the size range of the above-mentioned at least part of the channels 121 is set in accordance with the size of the quantum dots to be provided in the at least part of the channels.

In the embodiments of the present disclosure, the cross-sectional shape and the opening shape of the channels 121 may be any shapes, for example, a circle, a square, a rectangle, a rhombus, a pentagon, a hexagon, and the like.

For example, in the optical filter 100 according to at least one example of the embodiments of the present disclosure, the ordered porous film 120 may include a porous anodic aluminum oxide (AAO) film or a titanium dioxide nano-tube array film.

Figure 3A:
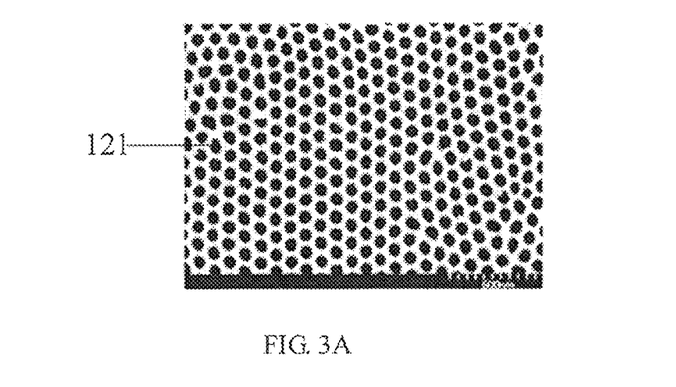
FIGS. 3A and 3B are schematic views of channels of an ordered porous film in an optical filter according to a further embodiment of the present disclosure.
Figure 3B:
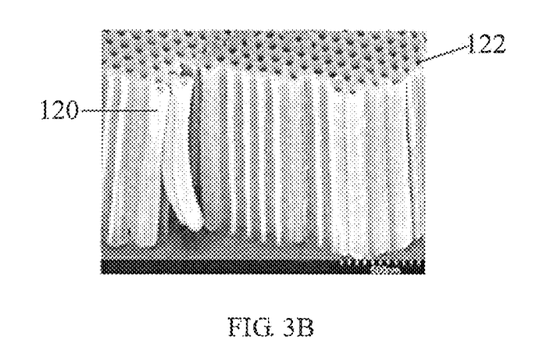

The porous anodic aluminum oxide (AAO) film has the advantages of being able to form highly ordered channels, having controllable pore size and pore spacing of channels, exhibiting excellent thermal stability, being insulating and having a simple preparation process. In addition, the porous anodic aluminum oxide film is a wide band gap material having good optical properties and high light transmission in the near ultraviolet to near infrared band. As illustrated in FIGS. 3A and 3B, channels periodically arranged and having a pore size of from 5 nm to 200 nm can be prepared in the porous anodic aluminum oxide (AAO) film, where the channels can be substantially perpendicular to the base substrate. Therefore, by filling the channels of the porous anodic aluminum oxide film with quantum dots as optical filters, the utilization of the quantum dots can be greatly improved and the display color gamut of the display device such as a liquid crystal display can be improved as well.

The surface layer of the titanium dioxide nano-tube array film may be formed to be similar to the morphology of the porous anodic aluminum oxide film, and the lower layer is a nano-tube ordered array. For example, the nano-tube may have a diameter of from 20 nm to 100 nm.

Apparently, the embodiments of the present disclosure include, but not limited to, porous anodic aluminum oxide films and titanium dioxide nano-tube array films, and any porous film of ordered channels extending in a direction substantially perpendicular to the base substrate and having a pore size close to the size of the quantum dots can be used in the optical filter of the embodiments of the present disclosure. Because channels having good uniformity and substantially perpendicular to the base substrate are more easily formed in the porous anodic aluminum oxide film, the porous anodic aluminum oxide film is taken as an example in the embodiments of the present disclosure.

For example, in the optical filter 100 according to at least one embodiment of the present disclosure, the ordered porous film 120 may be transparent, which can ensure that the position at which the channels 121 in the ordered porous film 120 are located are transparent, so that excitation light can be irradiated to the quantum dots in the channels.

For example, the height of the channels 121 along the extension direction may be equal to the thickness of the ordered porous film 120, that is, the channels 121 may pass through the ordered porous film 120 to ensure that the position at which the channels 121 in the ordered porous film 120 are located are transparent, thereby ensuring that excitation light can be irradiated to the quantum dots in the channels. Apparently, the height of the channels 121 along the extension direction may also be smaller than the thickness of the ordered porous film 120 (i.e., the channels may be blind holes rather than through holes), provided that the position at which the channels 121 are located are transparent.

For example, the non-channel region of the ordered porous film 120 may also be opaque. The degree of transparency of the non-channel region depends upon the thickness of the ordered porous film 120. If the ordered porous film 120 is thick, the non-channel region may be opaque. In this case, the image displayed by the display device using the optical filter has a purer color and a higher color gamut; besides, if the non-channel region is opaque, the display brightness of the display device can be improved by providing a plurality of quantum dots (e.g., a column of quantum dots) in each of at least part of the channels. If the ordered porous film 120 is thin, the non-channel region may be transparent. As such, the color gamut of the image displayed by the display device using the optical filter is lower as compared with the case where the non-channel region is opaque, which yet helps to improve the display brightness.

In the optical filter 100 according to at least one example of the embodiment of the present disclosure, as illustrated in FIG. 1, the ordered porous film 120 may be in direct contact with the base substrate 110.

For example, as illustrated in FIG. 2, the optical filter 100 may further include a buffer layer 130 disposed between the base substrate 110 and the ordered porous film 120, the buffer layer 130 being in direct contact with the base substrate 110. The adhesion between the ordered porous film 120 and the base substrate 110 can be improved by providing the buffer layer 130 between the base substrate 110 and the ordered porous film 120.

For example, the buffer layer 130 may also be in direct contact with the ordered porous film 120.

For example, in the optical filter 100 according to at least one example of the embodiment of the present disclosure, the buffer layer 130 may be a molybdenum metal layer, and the base substrate 110 may be a glass substrate or a quartz substrate. Apparently, the embodiments of the present disclosure include, but are not limited thereto. Any transparent film capable of improving the adhesion between the optical filter 100 and the ordered porous film 120 may be used as the above buffer layer.

For example, the optical filter 100 according to at least one example of the embodiment of the present disclosure may also include a black matrix 194 disposed on the side of the ordered porous film 120 away from the base substrate 110, wherein the channels 121 in the ordered porous film 120 form a plurality of optical filter regions 150 spaced apart from each other by the black matrix 194. The black matrix 194 serves to prevent the light emitted from edges of different optical filter regions 150 from being mixed. In the embodiments of the present disclosure, for example, the channels in the ordered porous film can be highly ordered by making the channels 121 in each optical filter region 150 substantially consistent (e.g., making the opening size, the angle between the extension direction and the base substrate, and the like substantially consistent). The black matrix 194 may also be formed on the side of the base substrate 110 opposite to the ordered porous film 120, that is, the black matrix 194 and the ordered porous film 120 are formed on different sides of the base substrate 110. However, the setting of the black matrix is not limited to the above two cases in the embodiments of the present disclosure.

For example, the optical filter 100 according to at least one example of the embodiment of the present disclosure may also include an encapsulation layer 140 disposed on the ordered porous film 120 so as to protect the ordered porous film 120 and prevent the quantum dots in the channels from falling off.

For example, the material of the encapsulation layer 140 may be a transparent resin or the like.

Figure 8:
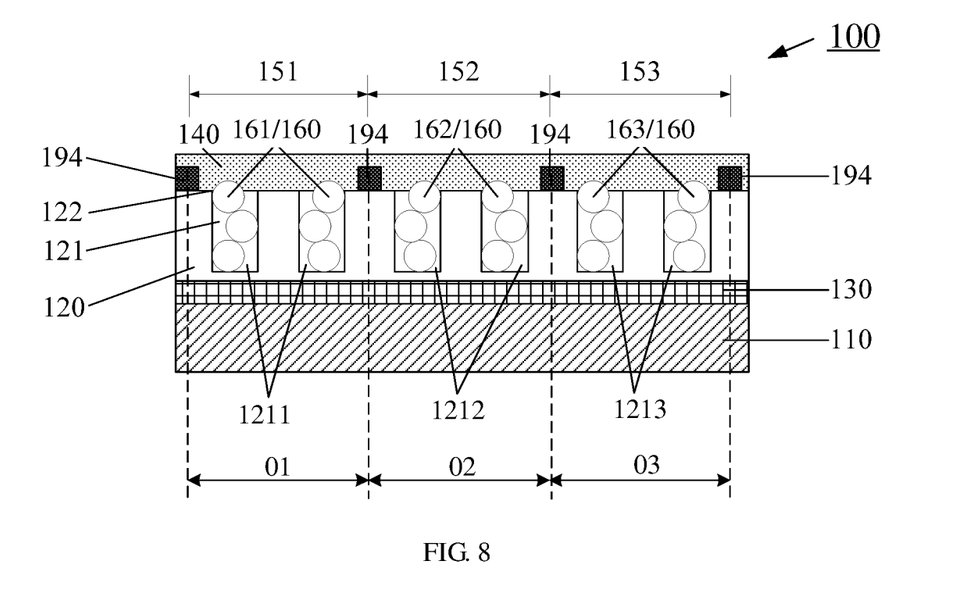
FIG. 8 is a schematic view of a display device including the optical filter illustrated in FIG. 2.

For example, in the optical filter 100 according to at least one example of the embodiment of the present disclosure, the above quantum dots 160 may include a plurality of first quantum dots 161, a plurality of second quantum dots 162, and a plurality of third quantum dots 163, as illustrated in FIG. 2. The first quantum dots 161, the second quantum dots 162, and the third quantum dots 163 are located in different optical filter regions, respectively, for example, in the first optical filter region 151, the second optical filter region 152, and the third optical filter region 153, respectively, and can emit light of different colors after being excited. These optical filter regions, for example, are corresponding to sub-pixel regions 01/02/03, respectively, as illustrated in FIG. 8.

In the embodiments of the present disclosure, the channels in the ordered porous film 120 may be periodically arranged, and the channels in the same period are highly consistent. For example, the channels in each optical filter region may form a period, or the channels in a plurality of optical filter regions (e.g., the first optical filter region 151, the second optical filter region 152, and the third optical filter region 153) as a whole may form a period. Apparently, the embodiments of the present disclosure include, but are not limited thereto.

For example, the plurality of first quantum dots 161, the plurality of second quantum dots 162, and the plurality of third quantum dots 163 can emit red light, green light, and blue light which are symmetrical and have a narrow spectrum when excited by, for example, blue light or violet light, so as to achieve high color gamut color display and improve display effects.

In the embodiments of the present disclosure, the sizes of the first, second and third quantum dots which emit light of different colors are generally different. In this case, the average sizes of the openings of the channels in the ordered porous film 120 may be set to be the same or may be set in accordance with the size of the quantum dots disposed therein respectively. That is, the opening sizes of the first channels 1211 in the first optical filter region 151, the second channels 1212 in the second optical filter region 152, and the third channels 1213 in the third optical filter region 153 may be the same or different, as long as they are greater than the average size of the quantum dots with the minimum average size in the first, second and three quantum dots.

It should be noted that the quantum dots 160 are not limited to three kinds, and there may also be two or more than three kinds of quantum dots. For example, the quantum dots may include a plurality of first quantum dots and a plurality of second quantum dots, the second quantum dots and the first quantum dots being located in different optical filter regions (e.g., the first optical filter region and the second optical filter region) respectively and can emit light of different colors after being excited.

Embodiment II

An embodiment of the present disclosure provides a method of manufacturing an optical filter as illustrated in FIGS. 1 and 2, which comprises the following steps S1 and S2.

Step S1: forming an ordered porous film 120 on a base substrate 110, wherein the ordered porous film 120 is formed with channels 121 each of which having an extension direction at least at an angle to the base substrate 110 and having an opening 122 at a surface of the ordered porous film 120.

Step S2: immersing the ordered porous film 120 in a solution containing quantum dots so that each of at least part of the channels 121 is filled with at least one quantum dot 160.

The method of manufacturing an optical filter according to the embodiments of the present disclosure is simple, which can result in the production of a quantum dot optical filter with improved color gamut by taking advantage of the narrow emission peak of quantum dots so as to greatly enlarge the display color gamut of the display device such as a liquid crystal display; because the manufacturing method does not require the use of a color photoresist material, it can improve the utilization of quantum dots and reduce power consumption.

In order to prepare the ordered porous film onto the base substrate while allowing the extension direction of the channels in the ordered porous film to be perpendicular to the base substrate as much as possible so as to enable channels as many as possible to accommodate quantum dots, for example, in the above step S1, a metal layer may be deposited on the base substrate, and then the ordered porous film is formed from the metal layer.

For example, the above-mentioned metal layer may include an aluminum metal layer. In this case, for example, a porous anodic aluminum oxide film may be formed from the aluminum metal layer by an anodic oxidation method. The use of the anodic oxidation method facilitates the extension direction of the channels in the porous anodic aluminum oxide film prepared to be perpendicular to the base substrate as much as possible.

Apparently, the embodiments of the present disclosure include, but are not limited to, aluminum metal layers. For example, the above-mentioned metal layer may also include a titanium metal layer. If a titanium metal layer is used, a titanium dioxide nano-tube array film having an extension direction perpendicular to the channels of the base substrate as much as possible can be prepared by a method commonly used in the art.

For example, prior to forming an ordered porous film from the above metal layer, the method according to at least one example of the embodiment of the present disclosure may further comprise: forming a protective layer film on the metal layer, and then patterning the protective layer film to form a protective layer having a plurality of hollow portions arranged in a matrix, each of the hollow portions being corresponding to a partial area of the metal layer. On the one hand, the protective layer facilitates a high consistency of the channels formed by the ordered porous film in the area corresponding to the same hollow portion so as to ensure the periodicity of the channels in the ordered porous film; on the other hand, the protective layer can protect the position of the black matrix to be formed by the ordered porous film so as to ensure the consistency of the black matrix pattern.

For example, the material of the protective layer film may be a photoresist. As such, it is only necessary to expose and develop the protective layer film upon patterning the same, and the steps such as etching and the like are not required, i.e., the production process is quite simple.

For example, the material of the protective layer film may be a black photoresist. In this way, after forming the ordered porous film, the black photoresist material may be applied directly to the protective layer formed so as to form a black matrix without additionally adding the step of etching the protective layer, thereby simplifying the process.

For example, prior to forming the above metal layer on the base substrate, the manufacturing method according to at least one example of the embodiment of the present disclosure may further include: forming a buffer layer on the base substrate, the buffer layer being in direct contact with the base substrate. As such, the adhesion between the base substrate and the above metal layer subsequently formed on the buffer layer can be improved.

For example, as illustrated in FIGS. 4A to 4F, the method of manufacturing the optical filter 100 according to an embodiment of the present disclosure may include the following steps S01 to S07.

Figure 4A:
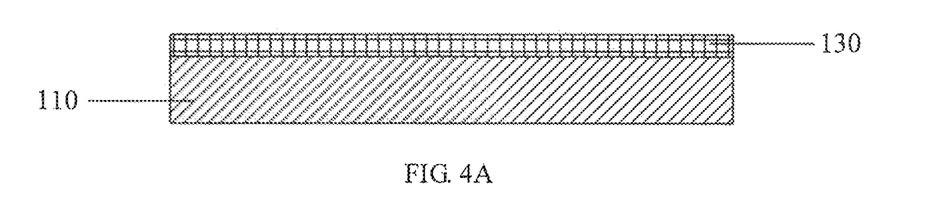
FIGS. 4A-4F are schematic views of a method of manufacturing an optical filter according to a further embodiment of the present disclosure.

Step S01: as illustrated in FIG. 4A, a buffer layer 130 is formed on the base substrate 110, the buffer layer 130 being in direct contact with the base substrate 110 so as to improve the adhesion between the base substrate 110 and the metal layer (not shown in FIG. 4A) to be formed on the buffer layer 130.

In this step, for example, the buffer layer 130 may be a molybdenum metal layer given that the base substrate is a glass substrate or a quartz substrate. For example, the molybdenum metal layer may be formed by a conventional means in the art such as magnetron sputtering.

Figure 4B:
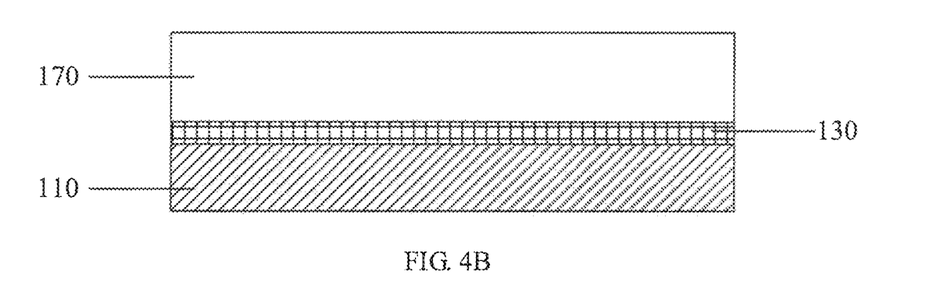

Step S02: as illustrated in FIG. 4B, a metal layer 170 is deposited on the buffer layer 130.

In this step, for example, the metal layer 170 may be an aluminum metal layer. For example, the metal layer 170 may be deposited on the buffer layer 130 by a conventional means in the art such as magnetron sputtering.

Figure 4C:
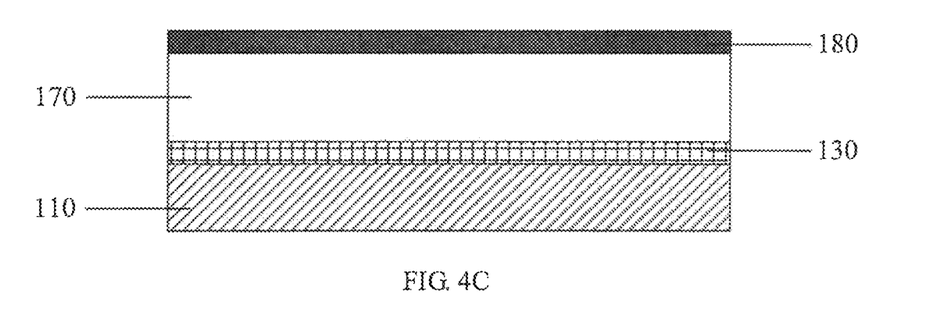

Step S03: as illustrated in FIG. 4C, a protective layer film 180 is formed on the metal layer 170.

In this step, for example, the protective layer film 180 may be formed by coating the metal layer 170 with a black photoresist. For example, the protective layer film may have a film thickness of from 1 µm to 2 µm and an optical density (OD) of greater than or equal to 4.0.

Figure 4D:
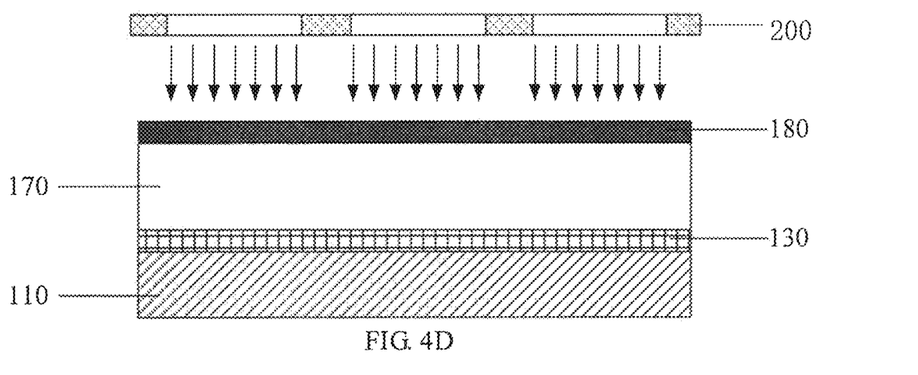
Figure 4E:
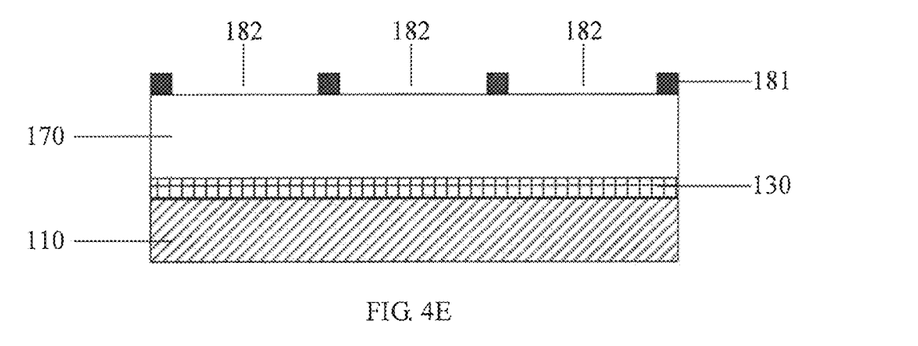

Step S04: as illustrated in FIG. 4D, the protective layer film 180 is exposed by a mask plate 200; as illustrated in FIG. 4E, a protective layer 181 having a plurality of hollow portions 182 is formed after development, the plurality of hollow portions 182 being arranged in a matrix and each of the hollow portions 182 being corresponding to a partial area of the metal layer 170.

For example, the plurality of hollow portions 182 may correspond to a plurality of optical filter regions 150 in Embodiment I, respectively.

Figure 4F:
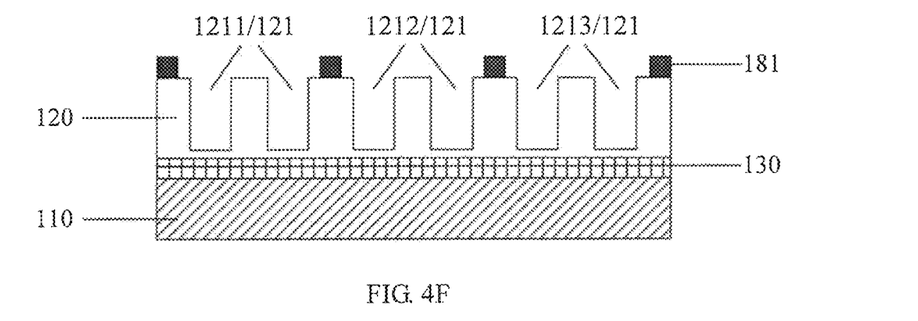

Step S05: as illustrated in FIG. 4F, an ordered porous film 120 is formed from the metal layer 170, wherein the ordered porous film 120 is formed with channels 121.

For example, the channels 121 may have the same opening size; alternatively, the channels 121 may include a plurality of first channels 1211, second channels 1212 and third channels 1213 which are periodically arranged, and the three types of channels may have different opening sizes.

For example, in this step, an ordered porous film 120 may be formed from the metal layer 170 by an anodic oxidation method. For example, the preparation of an ordered porous film 120 from the aluminum metal layer by an anodic oxidation method may include the following steps S051 to S053.

Step S051: primary oxidation is performed.

For example, in a 0.25-0.4 mol/L oxalic acid solution, a DC voltage of 35~45V is maintained, and ice water bath is used to maintain a constant temperature about 10° C. lower than room temperature. The aluminum metal layer on the base substrate is subjected to primary oxidation, for example, for 3 to 5 hours (the specific time may be adjusted according to the desired structure).

Step S052: after primary oxidation, the base substrate subjected to the above step S051 is rinsed and dried.

For example, the base substrate subjected to the above step S051 may be rinsed by means of a sprinkler using distilled water.

Step S053: secondary oxidation is performed.

The base substrate subjected to step S052 is placed in a mixed solution of phosphoric acid (5 to 8% by weight) and chromic acid (1 to 2% by weight) at 80° C., the $Al_2O_3$ film formed on the surface of the aluminum metal layer by primary oxidation is corroded, and secondary oxidation is then performed on the surface of a hexagonal pit array structure formed after primary oxidation, where the other conditions of the secondary oxidation are the same as that of the primary oxidation and the secondary oxidation lasts about eight to 11 hours.

The above process of making the porous anodic aluminum oxide film by the anodic oxidation method is only for illustrative purposes. The embodiments of the present disclosure include, but are not limited thereto. In addition, a person skilled in the art can adjust the diameter, shape, periodicity and the like of the channels formed on the surface of the base substrate by adjusting the production process of the porous anodic aluminum oxide film (for example, by adjusting the type of the acid solution, the conditions for oxidation, etc.). No further detail will be provided herein.

Step S06: the ordered porous film 120 is immersed in a solution containing quantum dots so that each of at least part of the channels 121 is filled with at least one quantum dot 160, as illustrated in FIGS. 1 and 2.

In this step, the solution containing quantum dots may be formed by dispersing the material of quantum dots into a solvent commonly used in the art such as water, ethanol or acetone.

Step S07: a black matrix layer 194 and an encapsulation layer 140 are formed on the ordered porous film 120, as illustrated in FIGS. 1 and 2.

In this step, the solvent in the solution containing quantum dots in the channels 121 is removed before the encapsulation layer 140 is formed so that only corresponding quantum dots are retained in the channels. For example, a volatile solvent may be used in the preparation of the solution containing quantum dots so as to facilitate removal of the solvent in the channels.

In the method of manufacturing an optical filter according to the embodiments of the present disclosure, a porous anodic aluminum oxide film having good periodicity and extending in a direction substantially perpendicular to the channels of the base substrate can be prepared by forming an aluminum metal layer on the base substrate and then using anodic oxidation techniques; the channels of corresponding optical filter regions can be filled with quantum dots by using a black photoresist and the processes of exposure and development. The process according to the embodiments of the present disclosure is simple, and the quantum dots of the optical filter prepared have high utilization efficiency and luminous efficiency, and can greatly improve the color gamut of the display device.

Embodiment III

The present embodiment differs from Embodiment II mainly in that: the above plurality of quantum dots include a plurality of first quantum dots and a plurality of second quantum dots, the second quantum dots and the first quantum dots being excited to emit light of different colors. Accordingly, the above channels in the ordered porous film 120 may include a plurality of first channels and a plurality of second channels. In this case, the step S2 described above may include, for example, the following steps S21 to S24.

Figure 5A:
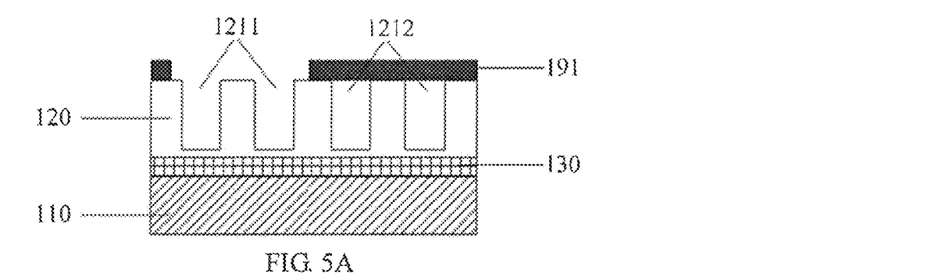
FIGS. 5A-5C are schematic views of a method of manufacturing an optical filter according to a further embodiment of the present disclosure.

Step S21: as illustrated in FIG. 5A, after forming the ordered porous film 120, a first barrier layer 191 is formed on the ordered porous film 120, wherein the first barrier layer 191 exposes the first channels 1211 and covers the second channels 1212.

For example, the material of the first barrier layer may be a black photoresist. As such, the first barrier layer can be formed by exposure and development without any etching step, thereby simplifying the process.

Figure 5B:
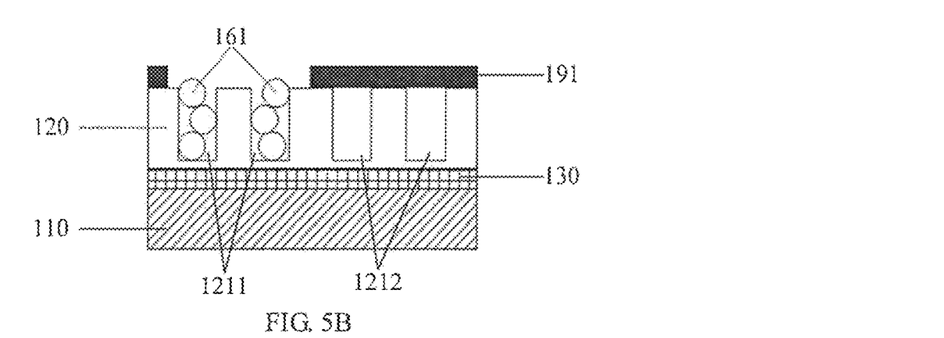

Step S22: as illustrated in FIG. 5B, the ordered porous film 120 on which the first barrier layer 191 is formed is immersed in a solution containing first quantum dots so that each of at least part of the first channels 1211 is filled with at least one of the first quantum dots 161.

In this step, the first barrier layer 191 can prevent the first quantum dots 161 from entering the second channels 1212.

For example, the solution containing first quantum dots may be formed by dispersing the material of quantum dots that emits a first color light (e.g., red light) into a solvent commonly used in the art such as water, ethanol or acetone.

Figure 5C:
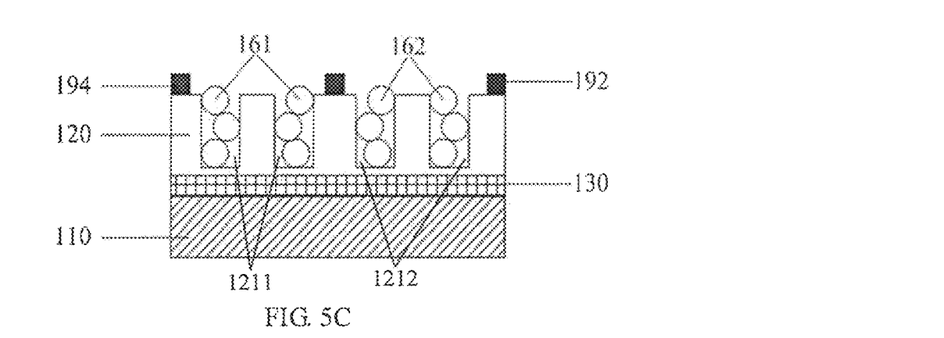

Step S23: as illustrated in FIG. 5C, a second barrier layer 192 is formed on the ordered porous film 120, wherein the second barrier layer 192 exposes the second channels 1212.

For example, the material of the second barrier layer may be a black photoresist. As such, the process for making the second barrier layer is simplified.

Step S24: as illustrated in FIG. 5C, the ordered porous film 120 on which the second barrier layer 192 is formed is immersed in a solution containing second quantum dots 162 so that each of at least part of the second channels 1212 is filled with at least one of the second quantum dots 162.

For example, the solution containing second quantum dots may be formed by dispersing the material of quantum dots that emits a second color light (e.g., green light) into a solvent commonly used in the art such as water, ethanol or acetone.

For example, in the above step S23, the second barrier layer 192 may cover the first channels 1211, for example, a new second barrier layer 192 is formed after removing the second barrier layer 192 that has been used before. Thus, in a subsequent step S24, the second barrier layer 192 may prevent the second quantum dots 162 from entering the first channels 1211 and prevent the second quantum dots 162 from affecting the quantum dots in the first channels 1211.

As for the production and setting of other components in the optical filter, reference can be made to the relevant description in Embodiments I and II. Thus, no further detail will be provided herein.

Embodiment IV

The present embodiment differs from Embodiment III mainly in that: the above plurality of quantum dots further comprise a plurality of third quantum dots, the third quantum dots, the second quantum dots and the first quantum dots being excited to emit light of different colors. Accordingly, the above channels in the ordered porous film may further include a plurality of third channels. In this case, the difference between step S2 in the present embodiment and step S2 in Embodiment III is as follows.

Figure 6A:
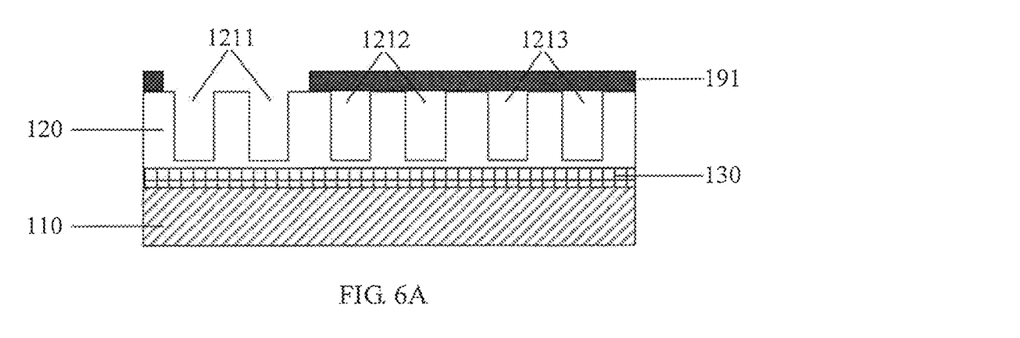
FIGS. 6A-6E are schematic views of a method of manufacturing an optical filter according to a further embodiment of the present disclosure.

In step S21, i.e., after forming the ordered porous film 120 and immersing the ordered porous film 120 in a solution containing first quantum dots, as illustrated in FIG. 6A, the first barrier layer 191 formed on the ordered porous film 120 exposes the first channels 1211 and covers the second channels 1212 and the third channels 1213 so that the first barrier layer 191 can prevent the first quantum dots 161 from entering the second channels 1212 and the third channels 1213 in step S22.

Figure 6B:
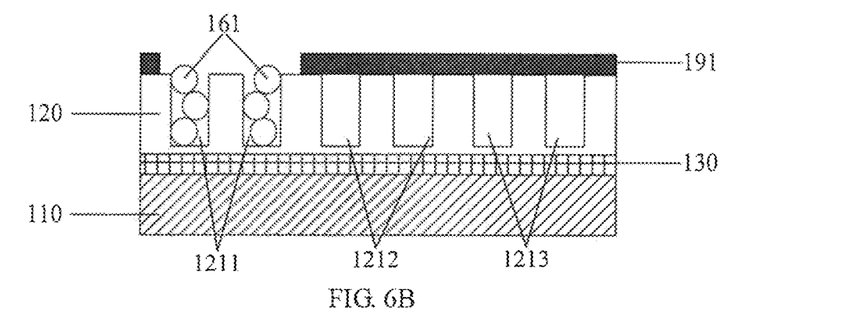
Figure 6C:
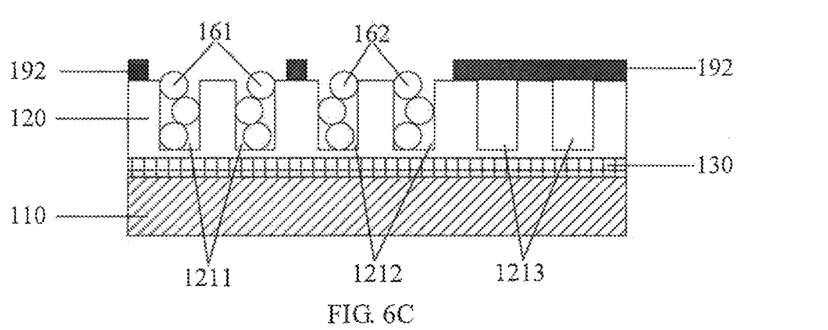

In step S23, i.e., after filling each of at least part of the first channels 1211 with at least one of the first quantum dots 161 as illustrated in FIG. 6B, the second barrier layer 192 formed on the ordered porous film 120 exposes the second channels 1212 and covers the third channels 1213 so that the second barrier layer 192 can prevent the second quantum dots 162 from entering the third channels 1213 in step S24.

Figure 6D:
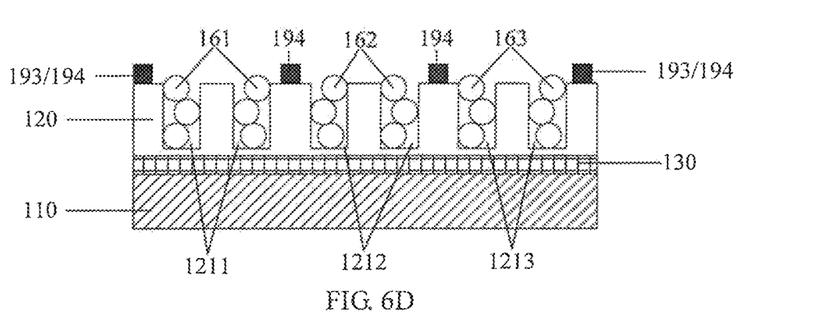

In addition, as compared with step S2 in Embodiment III, step S2 in the manufacturing method according to the present embodiment further comprises the following steps S25 and S26:

Step S25: as illustrated in FIG. 6D, a third barrier layer 193 is formed on the ordered porous film 120, wherein the third barrier layer 193 exposes the third channels 1213.

For example, the material of the third barrier layer may be a black photoresist. As such, the third barrier layer can be formed by exposure and development without any etching step, thereby simplifying the process.

Step S26: as illustrated in FIG. 6D, the ordered porous film 120 on which the third barrier layer 193 is formed is immersed in a solution containing third quantum dots 163 so that each of at least part of the third channels 1213 is filled with at least one of the third quantum dots 163.

In this step, the third barrier layer 193 may be used directly as a black matrix 194 so as to simplify the process.

For example, the solution containing third quantum dots may be formed by dispersing the material of quantum dos that emits a third color light (e.g., blue light) into a solvent commonly used in the art such as water, ethanol or acetone.

Figure 6E:
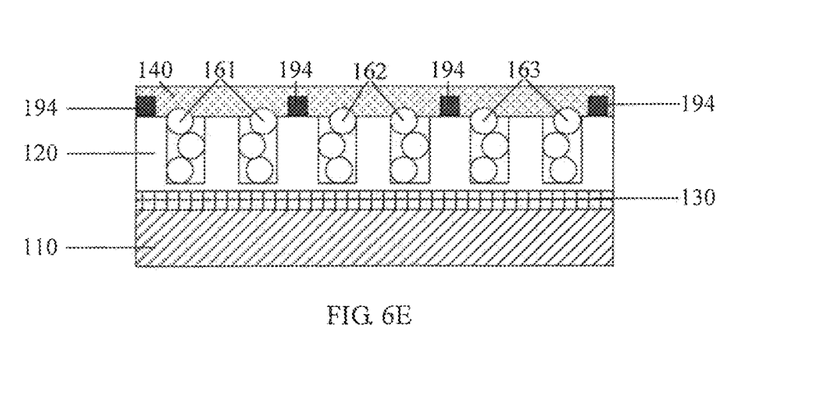

Apparently, the manufacturing method according to the present embodiment may also comprise the step of applying an encapsulation layer 140 on the ordered porous film 120 and the black matrix 194, as illustrated in FIG. 6E.

As for the production and setting of other components in the optical filter, reference can be made to the relevant description in Embodiments I and II. Thus, no further detail will be provided herein.

Embodiment V

The present embodiment differs from Embodiment IV mainly in that: the second barrier layer further covers the first channels, and/or the third barrier layer covers the first channels and the second channels.

For example, if the second barrier layer further covers the first channels and the third barrier layer covers the first channels and the second channels, the difference between step S2 in the present embodiment and step S2 in Embodiment IV is as follows.

Figure 7A:
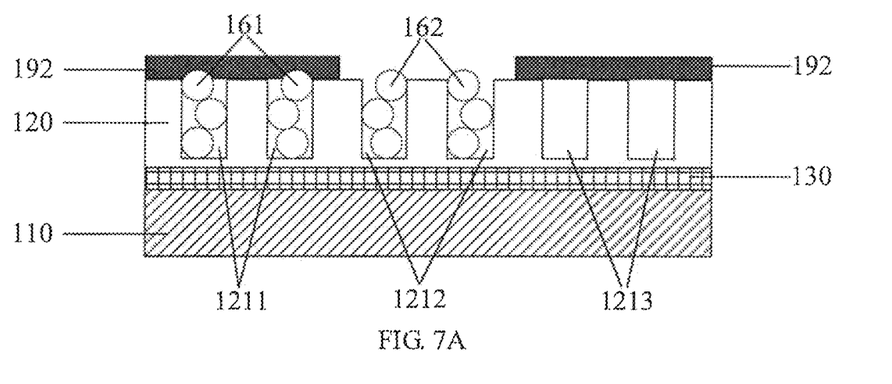
FIGS. 7A-7C are schematic views of a method of manufacturing an optical filter according to a further embodiment of the present disclosure.

In step S23, as illustrated in FIG. 7A, the second barrier layer 192 formed on the ordered porous film 120 exposes the second channels 1212 and covers the first channels 1211 and the third channels 1213 so that the second barrier layer 192 can prevent the second quantum dots 162 from entering the first channels 1211 and the third channels 1213 in step S24.

Figure 7B:
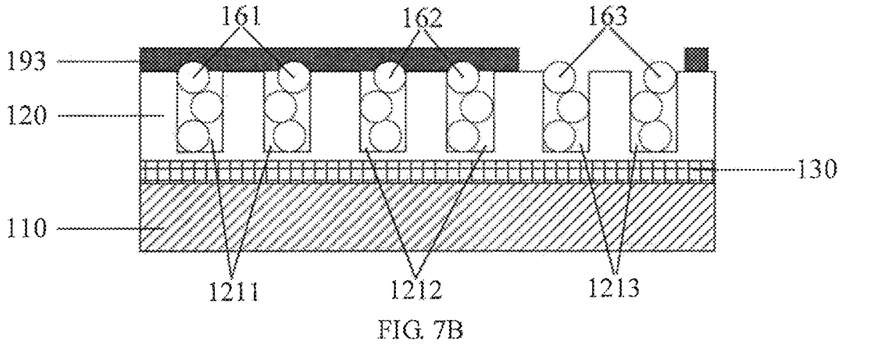

In step S25, as illustrated in FIG. 7B, the third barrier layer 193 formed on the ordered porous film 120 exposes the third channels 1213 and covers the first channels 1211 and the second channels 1212 so that the third barrier layer 193 can prevent the third quantum dots 163 from entering the first channels 1211 and the second channels 1212 in step S26.

Figure 7C:
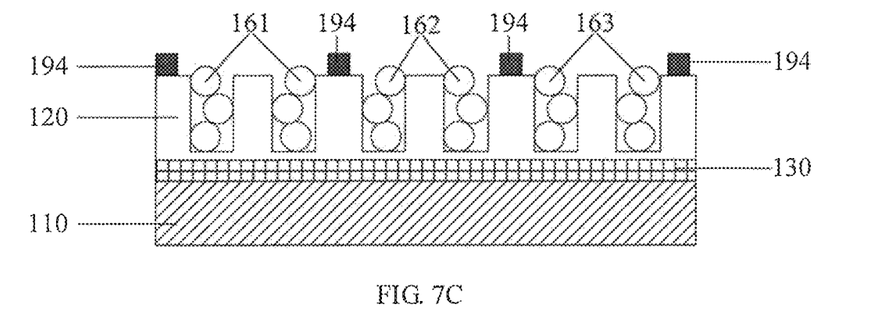

In addition, as compared with step S2 in Embodiment IV, step S2 in the manufacturing method according to the present embodiment may further include step S27, that is, the third barrier layer 193 is patterned (for example, the third barrier layer is exposed and developed) to form a black matrix 194, as illustrated in FIG. 7C.

As for the production and setting of other components in the optical filter, reference can be made to the relevant description in Embodiments I and II. Thus, no further detail will be provided herein.

In the method of manufacturing an optical filter according to the above embodiments of the present disclosure, the quantum dots are not limited to two or three kinds, and there may be more than three kinds of quantum dots. If there are more than three kinds of quantum dots, the manner in which these quantum dots are filled in the corresponding channels is similar to the manner in which each kind of quantum dots in the above embodiments are filled in the corresponding channels, and thus no further detail will be provided herein. For example, if the excitation light used is blue light, two regions (sub-pixels) including quantum dots emitting red light and green light respectively can be formed, and the third region is filled with no quantum dots to make it transmissible to blue light, thereby achieving three primary colors.

At least one embodiment of the present disclosure further provides a display substrate, comprising the optical filter as described in any one of the embodiments of the present disclosure.

For example, the display substrate may be a color film substrate or an array substrate.

At least one embodiment of the present disclosure further provides a display device, comprising the display substrate as described in any one of the embodiments of the present disclosure.

For example, the display device may be any product or component having a display function such as a liquid crystal panel, a mobile phone, a tablet, a TV set, a display, a laptop, a digital photo frame, a navigator, or the like.

The optical filter, the display substrate having the optical filter and the display device according to the embodiments of the present disclosure can greatly enlarge the display color gamut of a display device such as a liquid crystal display, and improve photon efficiency and reduce power consumption as well.

It shall be noted that:

(1) the drawings of the embodiments of the present disclosure only relate to the structures involved in the embodiments of the present disclosure, and reference may be made to conventional designs for other structures;

(2) the film thickness and shape of each layer in the drawings do not reflect the true scales, but merely aim to illustrate the contents of the embodiments of the present disclosure; and (3) the embodiments of the present disclosure and the features in the embodiments may be combined with each other if they are not contradictory.

The above are merely exemplary embodiments of the present disclosure, and are not intended to limit the scope of protection of the present disclosure, which is yet determined by the appended claims.

The present application claims the priority of the Chinese patent application No. 201510728954.9 submitted on Oct. 30, 2015, and the content disclosed in the above Chinese patent application is incorporated herein by reference as part of the present application.

What is claimed is:

1. An optical filter comprising:
a base substrate with a main surface;
an ordered porous film disposed on the main surface of the base substrate, wherein the ordered porous film is formed with channels each of which having an extension direction at an angle to the main surface of the base substrate and having an opening at a surface of the ordered porous film; and
a plurality of quantum dots respectively disposed in at least part of the channels;
the optical filter comprises plurality of optical filter regions spaced apart from each other, the plurality of optical filter regions comprise a first optical filter region and a second optical filter region which are adjacent to each other and spaced apart from each other, and the channels comprise a plurality of channels in the first optical filter region and a plurality of channels in the second optical filter region; the plurality of quantum dots comprise a plurality of first quantum dots and a plurality of second quantum dots, an average size of the first quantum dots is different from an average size of the second quantum dots; all the first quantum dots are in the plurality of channels in the first optical filter region and emit light of a first color under excitation of an excitation light, and the light of the first color exits from the first optical filter region; all the plurality of second quantum dots are in the plurality of channels in the second optical filter region and emit light of a second color under the excitation of the excitation light, and the light of the second color exits from the second optical filter region, and the second color is different from the first color;
an average size, in a direction parallel to the main surface of the base substrate, of the openings of the plurality of channels where the first quantum dots are located is different from an average size, in the direction parallel to the main surface of the base substrate, of the openings of the plurality of channels where the second quantum dots are located.

2. The optical filter according to claim 1, further comprising a black matrix disposed on a side of the ordered porous film away from the base substrate, wherein the black matrix defines the plurality of optical filter regions spaced apart from each other.

3. The optical filter according to claim 1, wherein sizes of the plurality of quantum dots in a same optical filter region of the plurality of optical filter regions are substantially same.

4. The optical filter according to claim 3, wherein the plurality of optical filter regions comprise a third optical filter region, the channels comprise a plurality of channels in the third optical filter region, the quantum dots further comprise a plurality of third quantum dots, and the plurality of third quantum dots are in plurality of channels in the third optical filter region;
- the first quantum dots, the second quantum dots and the third quantum dots are respectively in different regions of the plurality of optical filter regions, and the color of the light emitted by the first quantum dots under excitation of the excitation light, the color of the light emitted by the second quantum dots under excitation of the excitation light and a color of light emitted by the third quantum dots under excitation of the excitation light are different from each other;
- the average size of the first quantum dots, the average size of the second quantum dots and an average size of the third quantum dots are different from each other;
- the average size of the plurality of the channels where the plurality of first quantum dots are disposed in, the average size of the plurality of the channels where the plurality of second quantum dots are disposed in, and an average size of the plurality of the channels where the plurality of third quantum dots are disposed in are different from each other.

5. The optical filter according to claim 4, wherein the first quantum dots, the second quantum dots and the third quantum dots of the optical filter regions respectively emit red light, green light and blue light under excitation of the excitation light.

6. The optical filter according to claim 4, wherein the filter regions are periodically arranged, one first optical filter region, one second optical filter region and one third optical filter region constitute one repeating unit, and in one repeating unit, the first optical filter region, the second optical filter region and the third optical filter region are successively adjacent, and the optical filter comprises a plurality of the repeating units.

7. The optical filter according to claim 1, wherein the excitation light comprises at least one selected from a group consisting of blue light, violet light and ultraviolet light.

8. A display substrate, comprising the optical filter according to claim 1 and a plurality of pixel regions, wherein each of the plurality of pixel regions comprises a plurality of sub-pixel regions, and the plurality of optical filter regions are respectively in the plurality of sub-pixel regions in a one-to-one corresponding manner.

9. A display device, comprising the display substrate according to claim 8 and an excitation light source, wherein the excitation light source is on a side of the base substrate away from the ordered porous film, and is configured to emit the excitation light, and the excitation light is irradiated to the quantum dots in the channels after passing through the base substrate.

10. A method of manufacturing an optical filter, comprising:
- forming an ordered porous film on a base substrate, wherein the base substrate has a main surface, the ordered porous film is formed on the main surface of the base substrate and is formed with channels each of which having an extension direction at an angle to the main surface of the base substrate and having an opening at a surface of the ordered porous film; and
- immersing the ordered porous film in a solution containing quantum dots to allow each of at least part of the channels to be filled with at least one quantum dot, wherein
- the optical filter comprises plurality of optical filter regions spaced apart from each other, the plurality of optical filter regions comprise a first optical filter region and a second optical filter region which are adjacent to each other and spaced apart from each other, and the channels comprise a plurality of channels in the first optical filter region and a plurality of channels in the second optical filter region; the plurality of quantum dots comprise a plurality of first quantum dots and a plurality of second quantum dots, an average size of the first quantum dots is different from an average size of the second quantum dots; all the first quantum dots are in the plurality of channels in the first optical filter region and emit light of a first color under excitation of an excitation light, and the light of the first color exits from the first optical filter region; all the plurality of second quantum dots are in the plurality of channels in the second optical filter region and emit light of a second color under the excitation of the excitation light, and the light of the second color exits from the second optical filter region, and the second color is different from the first color;
- an average size, in a direction parallel to the main surface of the base substrate, of the openings of the plurality of channels where the first quantum dots are located is different from an average size, in the direction parallel to the main surface of the base substrate, of the openings of the plurality of channels where the second quantum dots are located.

11. The method according to claim 10, further comprising:
- forming a black matrix disposed on a side of the ordered porous film away from the base substrate, wherein the black matrix defines the plurality of optical filter regions spaced apart from each other.

12. The method according to claim 10, wherein sizes of the plurality of quantum dots in a same optical filter region of the plurality of optical filter regions are substantially same.

13. The method according to claim 12, wherein the channels comprise a plurality of first channels and a plurality of second channels, wherein
- a first barrier layer is formed on the ordered porous film, the first barrier layer exposing the first channels and covering the second channels;
- the ordered porous film with the first barrier layer is immersed in a solution containing first quantum dots to allow each of the plurality of first channels to be filled with at least one of the first quantum dots;
- then a second barrier layer is formed on the ordered porous film, the second barrier layer exposing the second channels; and
- the ordered porous film with the second barrier layer is immersed in a solution containing second quantum dots to allow each of the plurality of second channels to be filled with at least one of the second quantum dots.

14. The method according to claim 13, wherein the second barrier layer covers the first channels.

15. The method according to claim 13, wherein a material for forming the first barrier layer and the second barrier layer comprises a black photoresist.

16. The method according to claim 13, wherein the plurality of optical filter regions comprise a third optical filter region, the channels further comprise a plurality of channels in the third optical filter region, the quantum dots further comprise a plurality of third quantum dots, wherein
- after forming the ordered porous film and before immersing the ordered porous film in the solution containing first quantum dots, the first barrier layer formed on the ordered porous film exposes the first channels and covers the second channels and the third channels;
- after each of the plurality of first channels is filled with at least one of the first quantum dots, the second barrier layer formed on the ordered porous film exposes the second channels and covers the third channels;
- after each of the plurality of second channels is filled with at least one of the second quantum dots, a third barrier layer is formed on the ordered porous film and exposes the third channels; and
- the ordered porous film with the third barrier layer is immersed in a solution containing third quantum dots to allow each of the plurality of third channels to be filled with at least one of the third quantum dots, wherein
- the color of the light emitted by the first quantum dots under excitation of the excitation light, the color of the light emitted by the second quantum dots under excitation of the excitation light and a color of light emitted by the third quantum dots under excitation of the excitation light are different from each other;
- the average size of the first quantum dots, the average size of the second quantum dots and an average size of the third quantum dots are different from each other;
- the average size of the plurality of the channels where the plurality of first quantum dots are disposed in, the average size of the plurality of the channels where the plurality of second quantum dots are disposed in, and an average size of the plurality of the channels where the plurality of third quantum dots are disposed in are different from each other.

17. The method according to claim 16, wherein the first quantum dots, the second quantum dots and the third quantum dots of the optical filter regions respectively emit red light, green light and blue light under excitation of the excitation light.

18. The method according to claim 16, wherein
- the second barrier layer further covers the first channels; and/or
- the third barrier layer covers the first channels and the second channels.

19. The method according to claim 16, wherein the filter regions are periodically arranged;
- the optical filter region where the plurality of first quantum dots are disposed in is a first optical filter region, the optical filter region where the plurality of second quantum dots are disposed in is a second optical filter region, the optical filter region where the plurality of third quantum dots are disposed in is a third optical filter region; the channels in the first optical filter region, the second optical filter region and the third optical filter region are successively adjacent; the first optical filter region, the second optical filter region and the third optical filter region as a whole is a period.

* * * * *